Jan. 30, 1962

J. S. MICHIE 3,018,923

FLOW METERING DEVICE

Filed Jan. 31, 1958

INVENTOR.
JOHN S. MICHIE,
BY
Harold B. Hood
ATTORNEY.

Jan. 30, 1962 J. S. MICHIE 3,018,923
FLOW METERING DEVICE
Filed Jan. 31, 1958 2 Sheets-Sheet 2

INVENTOR.
JOHN S. MICHIE,
BY
Harold B. Hood
ATTORNEY.

United States Patent Office 3,018,923
Patented Jan. 30, 1962

3,018,923
FLOW METERING DEVICE
John S. Michie, Springfield, Ohio; Amanda Ann Michie, executrix of said John S. Michie, deceased, assignor to herself
Filed Jan. 31, 1958, Ser. No. 712,542
15 Claims. (Cl. 222—41)

This invention relates to a flow metering device and more particularly to a flow measuring and signalling mechanism which, in its several forms, may find primary utility when installed in an automotive vehicle to measure fuel flow to the engine thereof.

A primary object of the invention is to provide an installation for automobiles which, when manually activated, will measure the flow of a predetermined volume of fuel to the engine, and then will automatically signal that such predetermined volume has been delivered.

Another object of the invention is to provide an improved flow metering device.

A further object of the invention is to provide means in a flow meter for ensuring that fuel flow will not be interrupted by incorrect operation of the flow meter.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
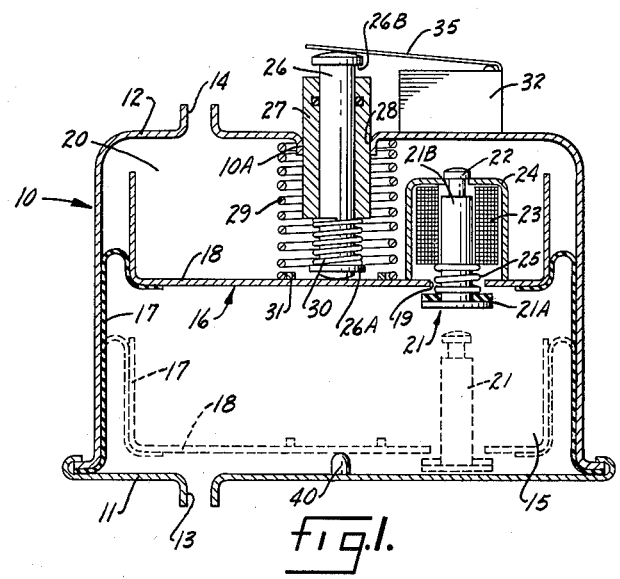
FIG. 1 is an illustration of one form of a flow measuring and signalling mechanism, constructed in accordance with the present invention.
Figure 2:
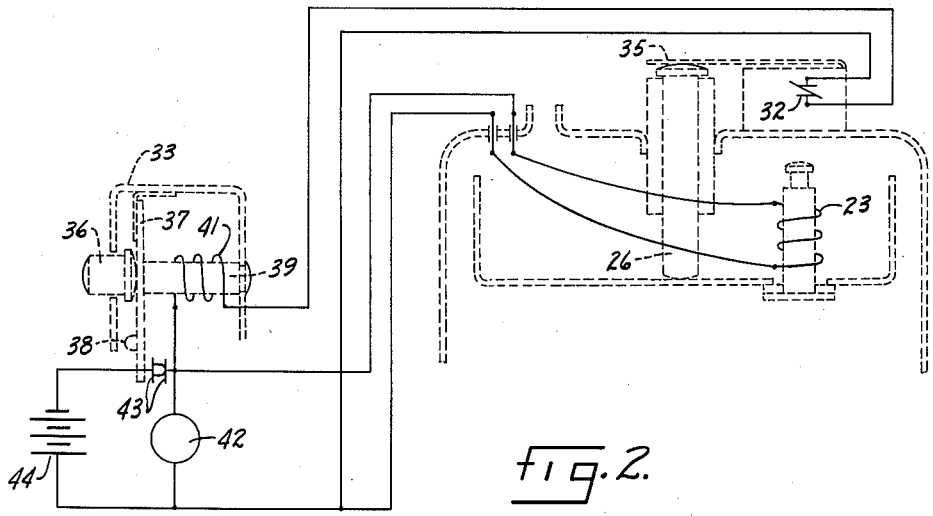
FIG. 2 is a schematic electrical diagram of the flow measuring and signalling mechanism of FIG. 1, showing the mechanism in a different operating position than FIG. 1.

Referring now to the drawings, and more particularly to FIGS. 1 and 2, a housing 10 is shown which comprises an upper portion 12 and a lower portion 11 secured thereto by means of crimping or the like. The housing 10 has an inlet port 13 formed in the lower portion 11 thereof and an outlet port 14 formed in the upper portion 12 thereof.

A movable wall, indicated generally by the numeral 16, comprises a fluid-tight, flexible sleeve 17 which is turned in upon itself and is secured in fluid-tight manner at one end between the lower and upper portions 11 and 12 of the housing 10 and at the other end to a rigid cup-like member 18. The movable wall 16 provides a fluid-tight partition dividing the housing 10 into an inlet chamber 15 and an outlet chamber 20, which are inversely-variable in volume as the movable wall 16 moves.

The rigid member 18 has an aperture 19 within which is received a valve 21. The aperture 19 acts as a fluid conduit between the inlet chamber 15 and the outlet chamber 20. The valve 21 comprises a plunger 21B having an enlarged end portion 21A which may close the aperture 19 by engaging the portion of the rigid member 18 therearound. A helical compression spring may be received around the plunger 21B between the enlarged portion 21A and a solenoid 23 to assist gravity in normally holding the valve 21 yieldably in an open position. The valve 21 may be closed by means of the energization of the solenoid 23 received within a housing 24 secured fixedly to the rigid member 18. If the movable wall 16 moves upwardly as viewed in FIG. 1 a sufficient distance, the valve 21 may also be opened, when the solenoid 23 is energized or in any case where the spring 25 fails to open the valve 21, by means of a projection 22 on the valve 21 engaging the housing 24.

A plunger 26 is reciprocably received within a suitable fluid-tight sleeve 27 which is secured within and closes an aperture 28 in the upper portion 12 of the housing 10. A helical spring 29 is received within the outlet chamber 20, about a raised portion 10A of the housing 10 surrounding the aperture 28 and about an annular projection 31 extending from the rigid member 18. The spring 29 tends to yieldably hold the movable wall 16 in the position shown in dotted lines in FIG. 1 against a stop 40 projecting from the lower portion 11 of the housing 10.

A further helical spring 30 is received between a flange 26A on the plunger 26 and the sleeve 27 and tends to urge the plunger 26 downwardly away from the contact arm 35 of an electrical switch 32. When the plunger 26 is in its most downward position as limited by a shoulder 26B, the electrical switch 32 is in a closed circuit position. When the plunger 26 is forced upwardly by the movable wall 16, the electrical switch 32 will be opened.

Referring in greater detail to FIG. 2, the member 33 represents a dashboard of an automobile within which is mounted a push button 36 and a signal light, represented schematically at 42. A resilient arm 37 of paramagnetic metal is secured to the member 33 and has a knocker 38 fixedly secured thereon. When a solenoid 41, having a core 39, is deenergized, the arm 37 will be released and the knocker 38 will be caused to strike against the member 33 giving an audible signal. The solenoid 23 and the signal light 42 are arranged electrically in parallel with one another and in series with a set of normally open contacts 43 and a battery 44. The battery 44 and the set of contacts 43 are also arranged in series with the solenoid 41 and the normally closed switch 32.

My fuel metering and signalling device may be secured underneath the hood of an automobile between the fuel pump and the carburetor, that is, a fuel line leading from the output of the fuel pump should communicate with the inlet port 13 and a fuel line should communicate between the outlet port 14 and the inlet of the automobile carburetor.

Assume that the automobile is being operated and the driver wishes to determine what mileage per gallon of fuel he is getting. The fuel metering and signalling device will be in the dotted line position shown in FIG. 1, that is, the movable wall 16 will be held in its most downward position by the spring 29, the valve 21 will be held open by the spring 25 and fuel will be flowing from the fuel pump into the inlet port 13, through the inlet chamber 15, open valve 21, outlet chamber 20 and outlet port 14 to the carburetor of the automobile. When the odometer of the automobile registers zero tenths, the driver presses the push button 36 causing the battery 44 to energize the solenoids 23 and 41 and to light the light 42.

Energization of the solenoid 23 results in a closing of the valve 21. Even though the driver removes pressure from the push button 36, the signal light 42 and the solenoid 23 will remain energized through the set of contacts 43 which are locked closed by means of energized solenoid 41 holding the arm 37 in a position such that the contacts 43 are closed.

Gasoline under pressure flows into the inlet chamber 15 of the housing 10 forcing the movable wall 16 upwardly away from its position abutting the stop 40 and causing fuel to be forced from the outlet chamber 20 and the mechanism assumes the operating position shown in FIG. 2. When the movable wall 16 has been pushed to the position shown in solid lines in FIG. 1, a predetermined amount of gasoline such as, for example, one-tenth of a gallon will have been forced from the outlet chamber 20 of the housing 10 out of the outlet port 14 to the carburetor of the automobile.

At this time, the plunger 26 is forced upwardly, causing the arm 35 of the switch 32 to move the switch to an open position. The opening of the electrical switch 32 breaks the circuit to the solenoid 41 thereby deenergizing it. The arm 37 is released causing the knocker 38 to slam against the member 33 signalling that one-tenth of a gallon of gasoline has been used. The release of the arm 37 breaks the circuit through the contacts 43 causing the signal light to go out and the solenoid 23 to be deenergized, thus opening the valve 21.

Gasoline now flows directly from the inlet chamber to the outlet chamber through the open valve 21 and from the outlet port 14 to the carburetor. Without interrupting the fuel flow to the carburetor, the helical spring 29 forces the movable wall 16 downwardly back to the position shown in dotted lines in FIG. 1. When the movable wall 16 reaches this lowermost position, the fuel metering and signalling device is ready for another measuring cycle.

It should be noted that, if the push button 36 is pressed when the odometer reads zero in the tenth mile column, and if the odometer shows that, for example, one and five-tenths miles has been covered at the time the mechanism indicates that one-tenth of a gallon of fuel has been used, the car is giving fifteen miles per gallon. It should also be noted that the driver receives both an audible signal (the knocker 38) and a visual signal (the signal light 42) that the prescribed amount of fuel has been used.

If for any reason the valve 21 does not open when the movable wall 16 moves the plunger 26 upwardly, the movable wall 16 will continue to move upwardly until the projection 22 engages the upper portion 12 of the housing 10, at which time the valve 21 will be forced open and there will be no interruption in the flow of gasoline to the carburetor of the automobile. Such a situation might occur during failure of spring 25, during a short of the electrical circuit or during continued depression of the push button 36.

Figure 3:
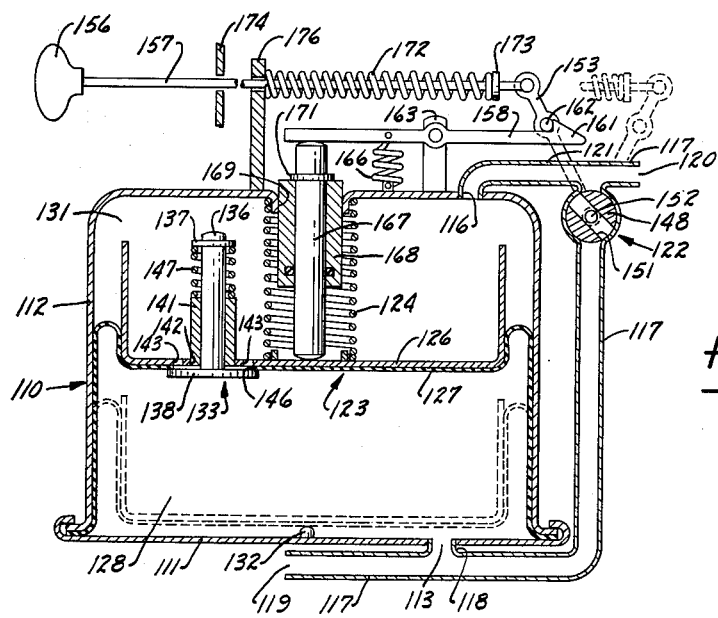
FIG. 3 is an illustration of a second form of such mechanism.

Referring now to FIG. 3, a second form of fuel metering and signalling device embodying my invention comprises a housing 110 with a lower portion 111 and an upper portion 112 having formed therein an inlet port 113 and an outlet port 116, respectively. A fluid conduit 117 is secured adjacent to the housing 110 and has one end 119 in communication with the outlet of the fuel pump (not shown) of an automobile and the other end 120 in communication with the carburetor (not shown) of the automobile. A fluid valve, indicated generally by the reference numeral 122, is located in the fluid conduit 117 for the control of fuel flow therein. The inlet port 113 of the housing 110 communicates with the fluid conduit 117 on one side of the fluid valve 122 by means of an inlet conduit 118. The outlet port 116 of the housing 110 communicates with the fluid conduit 117 on the other side of the fluid valve 122 by means of an outlet conduit 121.

A movable wall, indicated generally by the number 123, is constructed of a rigid cup-like member 126 and a flexible fluid tight member 127. The flexible fluid-tight member 127 is secured between the lower portion 111 and the upper portion 112 of the housing 110 in a fluid-tight manner by crimping or the like. The rigid cup-like member 126 is secured to the central portion of the flexible fluid-tight member 127. The movable wall 123 divides the inside of the housing 110 into an inlet chamber 128 and an outlet chamber 131 which are inversely variable in volume as the movable wall moves. When a fluid valve 133 is closed, the movable wall 123 separates these chambers in a fluid-tight manner.

The valve 133 comprises a plunger 136 having enlarged portions 137 and 138. The plunger 136 is reciprocably received within a fluid-tight sleeve 141 which is rigidly mounted within an aperture 142 in the rigid member 126. The rigid cup-like member 126 has a plurality of apertures 143 concentrically surrounding the aperture 142 in the rigid member 126. If the movable wall 123 is moved upwardly within the housing 110 to such a position that the upper end of the plunger 136 engages the housing 110, continued upward movement of the movable wall 123 causes the plunger 136 to be forced downwardly relative to the movable wall 123. In such a case, the plurality of apertures 143 and an aperture 146 in the flexible fluid-tight member 127 form a plurality of fluid conduits between the inlet chamber 128 and the outlet chamber 131.

The valve 122 comprises a cylindrical member 148 having a passage 151 therethrough. The cylindrical member 148 is rotatably received within the fluid passage 117 and is fixedly attached to a shaft 152 which, in turn, is fixedly attached to an arm 153. The valve 122, which is normally in an open position so as to allow fluid to pass therethrough, may be actuated to a closed position by an operator pulling the knob 156 leftwardly, as viewed in FIG. 3, causing the rod 157, which is pivotally attached to the arm 153, to pivot the arm 153 and rotate the cylindrical member 148 to a conduit-closing position.

When the valve 122 is closed in such a manner, it will be held closed by a latch 161 engaging a projection 162 on the arm 153. The latch 161 is part of a lever 158 which is pivotally secured to a mount 163 rigidly attached to the upper portion 112 of the housing 110. The rightward end of the lever 158 is normally held in the upward position shown in FIG. 3 by means of a tension spring 166 secured to and between the arm 158 and the upper portion 112 of the housing 110.

A plunger 167 is reciprocably mounted in a fluid-tight fashion within a sleeve 168 which is secured rigidly in fluid-tight fashion within an aperture 169 in the upper portion 112 of the housing 110. The plunger 167 has an enlarged portion 171 thereon which limits the downward movement of the plunger 167 and is normally held in abutting relationship with the sleeve 168 by the tension spring 166. When the movable wall 123 is in the position shown in solid lines in FIG. 3, upward movement of the movable wall 123 will cause the plunger 167 to move upwardly forcing the lever 158 to pivot about the mount 163 and to disengage the latch 161 from the projection 162, thus allowing the rod 157 to be forced rightwardly to the position shown in dotted lines in FIG. 3 by means of a helical compression spring 172 received between an enlarged portion 173 on the rod 157 and a rigid member 176 attached fixedly to the upper portion 112 of the housing 110. A member 174 which may represent the dashboard of the car provides a sounding board for the knob 156 to produce an audible signal when the valve 122 returns to the conduit-open position.

Assume that the automobile is being operated and that the driver wishes to determine the mileage per gallon thereof. The movable wall 123 will be in the position shown in FIG. 3 in dotted lines, and the fluid valve 122 will be open so as to allow fluid to flow from the fuel pump of the automobile through the fluid conduit 117 to the carburetor of the automobile. When the odometer of the automobile registers zero tenths, the driver pulls the knob 156 leftwardly to the position shown in FIG. 3 in solid lines, causing the valve 122 to be locked in a closed position by means of the latch 161. The fuel now flows through the inlet conduit 118 into the inlet chamber 128. Because the valve 133 is in its normally closed position, the movable wall 123 will begin to move upwardly under the pressure of the incoming fuel. As the movable wall 123 moves upwardly, fuel will be forced out of the outlet chamber 131 through the outlet conduit 121 to the carburetor of the automobile.

When the movable wall 123 has been moved to the position shown in solid lines in FIG. 3, a predetermined amount of gasoline, such as, for example, nearly one-tenth of a gallon will have been forced from the outlet chamber 131. A slight bit more of upward movement of the wall 123 will achieve the one-tenth gallon and will cause the plunger 167 to actuate the latch 161 to disengage the projection 162 and allow the valve 122 to be rapidly opened by the spring 172. This event will be signalled to the operator of the car by the slamming of the knob 156 against the dashboard 174 of the automobile, thus notifying him that one-tenth of a gallon of gasoline has been used.

The opening of the valve 122 will allow fuel to flow in its previous path from the fuel pump of the automobile through the conduit 117 and valve 122 to the carburetor of the automobile. The resulting reduced fuel pressure within the inlet chamber 128 will allow the helical spring 124 to force the movable wall 123 downwardly to the previously occupied position shown in dotted lines in FIG. 3. When the movable wall 123 reaches this lowermost position, the fuel metering and signalling device is ready for another measuring cycle. As the wall 123 moves downwardly, part of the fuel flowing through the conduit 117 will be diverted to refill the outlet chamber 131. It should be noted that, if the knob 156 is pulled when the odometer of the automobile reads zero in the tenth mile column, and if the odometer shows that, for example, one and six-tenths miles has been covered at the time the mechanism indicates that one-tenth of a gallon of fuel has been used, the car is giving sixteen miles per gallon.

If, for any reason, the valve 122 is not opened in the above-described manner at the end of the measuring cycle, the movable wall 123 will continue to move upwardly until the upper end of the plunger 136 engages the housing 110. Continued upward movement of the movable wall 123 will then cause the spring 147 to be compressed and the valve 133 to be opened, thus allowing fluid flow from the inlet chamber 128 through the passages formed by the apertures 146 and 143. In such a manner valve 133 acts as a safety device ensuring that fuel flow will not be interrupted between the fuel pump and the carburetor of the automobile.

Figure 4:
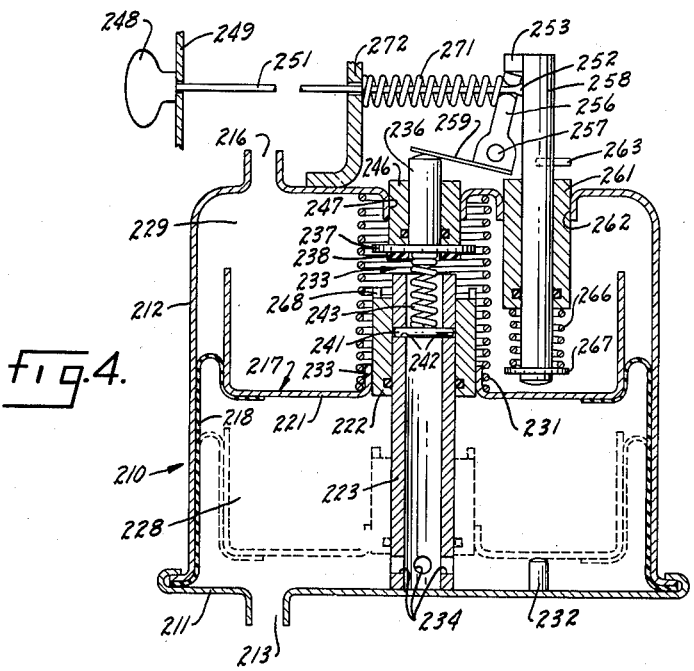
FIG. 4 is a similar illustration of another form of such mechanism.

Referring now to FIG. 4, still another embodiment of my fuel measuring and signalling device may include a housing 210 having a lower portion 211 and an upper portion 212 with inlet port 213 and outlet port 216 formed respectively therein. A movable wall, indicated generally at 217, consists of a flexible fluid-tight sleeve 218, a rigid annular member 221 and a cylindrical sleeve 222. Flexible fluid-tight sleeve 218 has one end clamped in a fluid-tight manner between the upper and lower portions 212 and 211 of the housing 210; and the other end of said sleeve is turned in upon itself and secured, with a fluid-tight seal, to the rigid annular member 221. The rigid member 221 is fixedly attached to the cylindrical sleeve 222 in a fluid-tight manner. The cylindrical sleeve 222 is received for reciprocation in a fluid-tight manner about a cylindrical fluid conduit 223.

The flexible sleeve 218, rigid member 221 and cylindrical sleeve 222 cooperate to make the movable wall 217 a fluid-tight partition between an inlet chamber 228 and an outlet chamber 229 which are inversely variable in volume as the movable wall 217 moves. A helical spring 231 is received between the upper portion 212 of the housing 210 and the movable wall 217 and yieldably holds the movable wall 217 against the stop 232 in the position shown in dotted lines in FIG. 4.

The inlet port 213 communicates with the outlet of a fuel pump of an automobile within which my fuel measuring and signalling mechanism is installed and the outlet port 216 communicates with the carburetor of the automobile. In normal operation of the automobile, fuel passes from the fuel pump through the inlet port 213 into the inlet chamber 228, through a plurality of passages 234 in the base of conduit 223, upwardly through the fluid conduit 223, through a normally open valve, indicated generally by the numeral 233, into the outlet chamber 229 and out the outlet port 216 to the carburetor of the automobile.

The valve 233 comprises a plunger 236 reciprocably received in a fluid-tight fashion within a sleeve 246 which is fixedly mounted in fluid-tight manner within an aperture 247 in the upper portion 212 of the housing 210. Plunger 236 has an enlarged portion 237 on the lower end thereof to which is secured a flexible washer 238 which, when the valve 233 is closed, contacts the upper surface of the fluid conduit 223 to close said conduit. A pin 241 is secured in a non-leakable manner within a pair of bores 242 in the fluid conduit 223, and provides support for one end of a compression spring 243 which forces against the plunger 236 to yieldably hold the valve 233 in its normally open position.

The plunger 236 of the valve 233 may be forced downwardly to close the valve 233 by pulling a knob 248 leftwardly as viewed in FIG. 4 away from the dashboard 249 of the automobile within which my apparatus is installed. The knob 248 is secured to a rod 251 having an enlarged end 252, which, when the knob 248 is moved leftwardly pivots the lever 256 about the axis of a shaft 257 which is fixedly secured relative to the housing 210. The lever 256 has an arm 259 arranged to force the plunger 236 downwardly to a closed valve position when the lever 256 is pivoted in a counter-clockwise direction by said leftward movement of the knob 248.

A latch 253 is so arranged as to hold the lever 256 in such a counter-clockwise position even though the operator of the car no longer exerts a pulling force on the knob. The latch 253 is fixedly secured to a plunger 258 reciprocably mounted in a leak proof manner within a fluid-tight sleeve 261 secured fixedly in a non-leaking manner within an aperture 262 in the upper portion 212 of the housing 210. The latch 253 is normally in the solid line position of FIG. 4 but, when the knob 248 is pulled to the leftward position, the latch 253 disengages the upper end of the lever 256 and is moved downwardly to the right of lever 256 by means of a spring 266 received about the plunger 258 between an enlarged portion 267 of the plunger 258 and the fluid-tight sleeve 261. The plunger 258 and latch 253 will move downwardly until a stop 263 projecting from the plunger 258 abuts the upper end of the fluid-tight sleeve 261.

When the movable wall 217 moves upwardly a sufficient distance, it will force against the lower end of the plunger 258 moving the latch 253 upwardly. A spring 271 is provided about the rod 251 and between the lever 256 and a support 272 which is rigidly secured to the upper portion 212 of the housing 210. When the latch 253 moves above the lever 256, the spring 271 will force the lever 256 rightwardly to the position shown in FIG. 4, thus allowing the valve 233 to be opened by the spring 243.

This measuring and signalling device operates in a manner similar to my above-described embodiments. A driver, desiring to determine mileage per gallon, pulls the knob 248 away from the dashboard 249 of the instant the odometer of the car reads zero tenths, and until he feels the latch 253 lock the lever 256. The valve 233 is thereby held closed and fuel flowing into the housing 210 from the fuel pump of the car forces the movable wall 217 upwardly. The resulting expansion of the inlet chamber 228 decreases the size of the outlet chamber 229 forcing fluid out of the outlet port 216 to the carburetor of the automobile.

The movable wall 217 moves upwardly until it engages the lower end of the plunger 258 and forces it a sufficient distance upwardly to allow the lever 256 to be forced by the spring 271 to the position shown in FIG. 4. The valve 233 is therefore free to open and is opened by the spring 243, thus allowing fuel to flow between the outlet and inlet chambers. When the lever 256 pivots in a clockwise direction, the knob 248 strikes against the dashboard 249 giving an audible signal that precisely a predetermined amount of fuel, for example, one tenth gallon, has been delivered to the carburetor.

The opening of the valve 233 results in a decreased pressure within the inlet chamber 228 allowing the spring 231 to return the movable wall 217 to the dotted line position of FIG. 4, readying the device for another measuring cycle. It should be noted that, if the knob 248 is pulled when the odometer of the automobile reads zero in the tenth mile column, and if the odometer shows that, for example, one and seven-tenths miles has been covered at the time the mechanism indicates that one-tenth of a gallon of fuel has been used, the car is giving seventeen miles per gallon.

In case the spring 243 or the spring 271 should fail, or if, for any reason, the fluid valve 233 is not opened upon the upward movement of the latch 253, means have been provided for positively lifting the washer 238 from its seat. A plurality of projections 268 extend upwardly from the cylindrical sleeve 222 and, as to the movable wall 217 continues to move upwardly, engage the enlarged portion 237 of the plunger 236 so as to open the valve 233 and allow fuel to flow therethrough. Thus, in such a situation, there will be no interruption in the flow of gasoline from the fuel pump to the carburetor of the automobile.

I claim as my invention:

1. A flow metering device comprising a container having a fluid inlet and a fluid outlet, a wall movably received within said container between said fluid inlet and said fluid outlet and thereby dividing said container into a variable-volume inlet chamber and an inversely variable-volume outlet chamber, means yieldably biasing said wall toward movement in a direction to reduce the volume of said inlet chamber, said wall being provided with a fluid passage therethrough communicating between said inlet chamber and said outlet chamber, a valve controlling fluid flow through said passage, manually manipulable means for closing said valve whereby fluid flowing into said fluid inlet will move said wall against the tendency of said biasing means, to force fluid from said fluid outlet, and means for opening said valve to allow flow between said chambers, said opening means actuated by said wall reaching a predetermined position relative to said container.

2. A flow metering device comprising a housing having a fluid inlet and a fluid outlet, a wall movably received within said housing between said fluid inlet and said fluid outlet, a flexible fluid-tight sleeve secured in a fluid-tight manner between and to said wall and said housing and, with said wall, dividing said housing into an inlet chamber and an outlet chamber which are inversely variable in volume as said wall moves, resilient means arranged between said wall and said housing to yieldably hold said wall in a predetermined position adjacent said fluid inlet, said wall being provided with a fluid passage therethrough communicating between said inlet chamber and said outlet chamber, a valve controlling fluid flow through said passage, manually manipulable means for closing said valve whereby fluid flowing into said fluid inlet will move said wall toward said outlet forcing fluid from said outlet chamber and out of said fluid outlet, and means for opening said valve to allow flow between said chambers, said opening means actuated by movement of said wall into a predetermined degree of proximity to said fluid outlet to open said valve, thus establishing open communication between said chambers.

3. A flow metering device comprising a container having a fluid inlet and a fluid outlet, a wall movably received within said container between said fluid inlet and said fluid outlet and thereby dividing said container into an inlet chamber and an outlet chamber, said wall being provided with a passage therethrough communicating between said inlet chamber and said outlet chamber, a fluid valve controlling flow through said passage, manually manipulable means for closing said valve whereby fluid flowing into said inlet chamber through said fluid inlet will move said wall forcing fluid from said outlet chamber through said fluid outlet, and means for opening said valve to allow flow between said chambers, said opening means actuated by said container when said wall with valve therein moves to a predetermined position relative to said container.

4. A fluid metering device comprising a container having a fluid inlet and a fluid outlet, a wall movably received within said container between said fluid inlet and said fluid outlet and thereby dividing said container into a variable-volume inlet chamber and an inversely variable-volume outlet chamber, means yieldably biasing said wall toward movement in a direction to reduce the volume of said inlet chamber, said wall being formed with a fluid passage therethrough communicating between said inlet chamber and said outlet chamber, a valve yieldably biased toward an open condition and controlling fluid flow through said passage and normally permitting fluid flow through said container from said fluid inlet to said fluid outlet, manually manipulable means for closing said valve whereby fluid flowing into said inlet will move said wall against the tendency of said biasing means, to force fluid from said fluid outlet, and means for opening said valve to allow flow between said chambers, said opening means actuated by said wall reaching a predetermined position relative to said container.

5. A flow metering device comprising a container having a fluid inlet and a fluid outlet, a wall movably received within said container between said fluid inlet and said fluid outlet and thereby dividing said container into an inlet chamber and an outlet chamber which are inversely variable in volume as said movable wall moves, said wall being provided with a fluid passage communicating between said inlet chamber and said outlet chamber, a fluid valve yieldably biased toward an open condition and controlling said passage and normally permitting fluid flow through said container from said fluid inlet to said fluid outlet, manually manipulable means for closing said valve whereby fluid flowing into said inlet chamber through said fluid inlet will move said wall forcing fluid from said fluid outlet, and means for opening said valve actuated by said container when said wall reaches a predetermined position relative thereto.

6. A flow metering and signalling device comprising a housing having a fluid inlet and a fluid outlet, a wall movably received within said housing between said fluid inlet and said fluid outlet, a flexible fluid-tight sleeve secured in fluid-tight manner between and to said wall and said housing, and with said wall, dividing said housing into an inlet chamber and an outlet chamber which are inversely variable in volume as said wall moves, a compression spring in said outlet chamber arranged between said wall and said housing to yieldably hold said wall in a first predetermined position adjacent to said fluid inlet, said wall having therethrough a fluid passage communicating between said inlet chamber and said outlet chamber, a solenoid actuated fluid valve yieldably biased toward an open condition for controlling flow through said passage, manually manipulable means for energizing the solenoid of said valve to close said valve whereby fluid flowing into said inlet chamber through said fluid inlet will move said wall relative to said container forcing fluid from said fluid outlet, means for deenergizing said solenoid for allowing said valve to open when said wall has moved to a second predetermined position adjacent to said fluid outlet, and a second means to open said valve actuated by said container and operable when said wall is moved past said second predetermined position.

7. The device of claim 6 in which said means for deenergizing said solenoid comprises, an electrical switch yieldably biased toward a closed condition in series with said solenoid and actuated mechanically to an open position by said wall upon reaching said second predetermined position.

8. The device of claim 6 in which said valve and said second means to open said valve comprise a plunger reciprocably received with respect to said wall and extending through said passage into said inlet and outlet chambers, said plunger having at one end an enlarged portion within said inlet chamber of suitable size to cover said passage when drawn thereagainst by said solenoid, the other end of said plunger projecting into said outlet chamber so that when said wall is moved past said predetermined position said plunger will be engaged by said container and moved relative to said wall to a passage opening position.

9. The device of claim 6 additionally comprising a signal light arranged in electrical parallel with said solenoid so as to be energized and deenergized simultaneously therewith.

10. A flow metering device comprising a container having a fluid inlet and a fluid outlet, a wall movably received within said container between said fluid inlet and said fluid outlet and thereby dividing said container into an inlet chamber and an outlet chamber, a fluid conduit fixedly secured to said container and communicating between said inlet chamber and said outlet chamber, a valve yieldably biased toward an open position and located at the outlet chamber end of said fluid conduit normally permitting fluid flow through said fluid conduit from said inlet chamber to said outlet chamber, manually manipulable means for closing said valve whereby fluid flowing into said inlet chamber through said fluid inlet will move said wall forcing fluid from said fluid outlet, and a first means for opening said valve actuated by said wall when said wall reaches a predetermined position relative to said container, said wall having incorporated therein a second means for opening said valve operable when said wall moves past said predetermined position.

11. The device of claim 10 in which said fluid conduit comprises a hollow member secured to said container within said inlet chamber, extending axially within said container and opening into said outlet chamber, said hollow member having a passage therein communicating between the hollow portion of said hollow member and said inlet chamber; and in which said valve comprises a plunger axially and reciprocably received in fluid-tight manner within said container, said plunger having an enlarged end extending into said outlet chamber adapted to close said fluid conduit opening when moved into abutting relationship thereto.

12. The device of claim 11 in which said movable wall comprises a rigid annular device reciprocably received in a fluid-tight manner about said hollow fluid conduit, and a flexible fluid-tight sleeve secured in a fluid-tight manner by one end thereof to said container, the other end thereof turned in upon itself and secured, with a fluid-tight seal, to said rigid annular device; and in which said inlet chamber and said outlet chamber are inversely variable in volume as said movable wall moves.

13. The device of claim 12 in which said means for closing said valve and said means for opening said valve comprise a compression spring having one end fixed relative to said container and the other end abutting the enlarged end of said plunger for yieldably holding said valve in an open position, a lever pivotally attached to said container and operable to force said plunger axially toward and to close said fluid conduit, a second plunger reciprocably received in a fluid-tight manner in said housing, and a latch fixed to said second plunger for locking said lever and thereby said valve in a closed position, said second plunger extending into said outlet chamber in such a manner that said wall can engage and move said second plunger causing said latch to unlock said lever and allow said valve to open when said wall reaches the predetermined position; and additionally comprising means for signalling when said wall reaches the predetermined position.

14. The device of claim 12 in which said second means for opening said valve comprises abutment means on said rigid annular device, said abutment means extending into said outlet chamber in such a manner as to engage the enlarged end of said plunger and force the valve to an open position when said wall moves past the predetermined position.

15. In a flow metering device, a container having an inlet port near one end thereof and an outlet port near the other end thereof, partition means mounted in said container for movement longitudinally thereof to define therein an inlet chamber and an outlet chamber respectively communicating with said ports and inversely variable in volume as said partition means moves, said partition means being formed to provide an opening therethrough communicating with said respective chambers, valve means yieldably biased toward an open position dominating said opening, resiliently biased, manually manipulable means shiftable against its bias to move said valve to closed position to cut off flow between said chambers whereby fluid forced into said inlet chamber through said inlet port will move said wall toward said outlet port to force fluid out of said outlet chamber through said outlet port, means for retaining said shiftable means and said valve in valve-closed positions, and means actuable by said movable wall, upon attainment of a predetermined position of proximity to said outlet port, to release said retaining means.

References Cited in the file of this patent

UNITED STATES PATENTS

| | | |
|---|---|---|
| 1,186,948 | Scheible | June 13, 1916 |
| 1,926,149 | Hurlbunk et al. | Sept. 12, 1933 |
| 1,934,545 | Langdon | Nov. 7, 1933 |
| 2,129,801 | Wallace | Sept. 13, 1938 |
| 2,209,689 | Dew | July 30, 1940 |
| 2,503,376 | Burgess | Apr. 11, 1950 |
| 2,755,966 | Lindars | July 24, 1956 |
| 2,755,979 | Lawson et al. | July 24, 1956 |
| 2,775,944 | Ryder et al. | Jan. 1, 1957 |